May 6, 1952 H. N. JAMES 2,595,461
SPEED CHANGE GEARING FOR GRAIN DRILLS
Filed Nov. 22, 1946 4 Sheets-Sheet 1
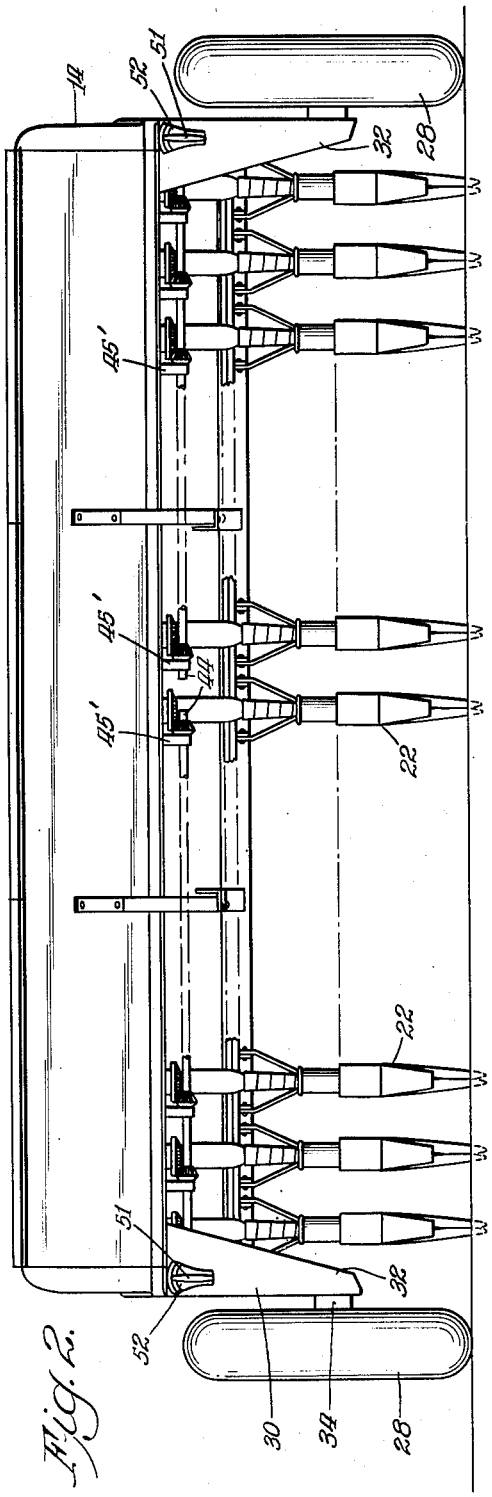
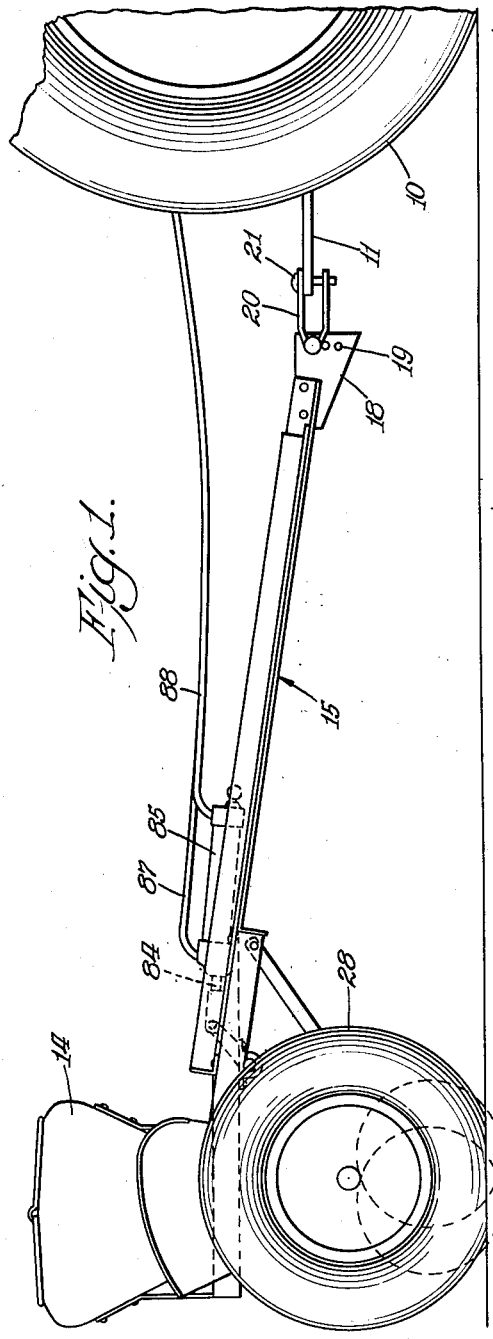
Inventor
Howell N. James
By Paul O. Pippel
Atty.

May 6, 1952 H. N. JAMES 2,595,461
SPEED CHANGE GEARING FOR GRAIN DRILLS
Filed Nov. 22, 1946 4 Sheets-Sheet 2

Inventor.
Howell N. James

May 6, 1952     H. N. JAMES     2,595,461
SPEED CHANGE GEARING FOR GRAIN DRILLS
Filed Nov. 22, 1946     4 Sheets-Sheet 3
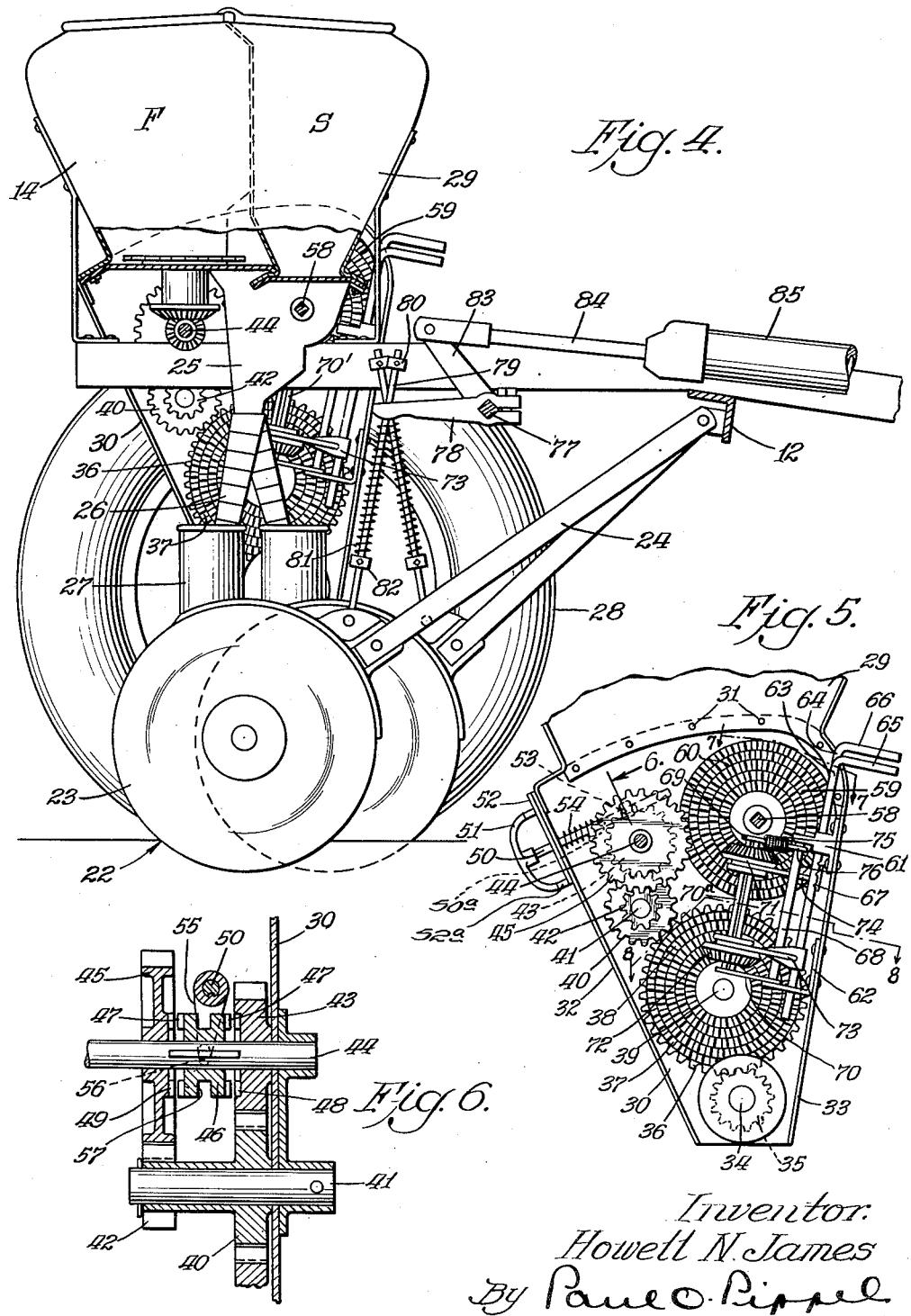
Inventor:
Howell N. James
By Paul O. Pippel
Atty.

May 6, 1952  H. N. JAMES  2,595,461
SPEED CHANGE GEARING FOR GRAIN DRILLS
Filed Nov. 22, 1946  4 Sheets-Sheet 4

INVENTOR
HOWELL N. JAMES
ATT'Y

Patented May 6, 1952

2,595,461

UNITED STATES PATENT OFFICE 2,595,461

SPEED CHANGE GEARING FOR GRAIN DRILLS

Howell N. James, Hamilton, Ontario, Canada, assignor, by mesne assignments, to International Harvester Company, Chicago, Ill., a corporation of New Jersey Application November 22, 1946, Serial No. 711,735

2 Claims. (Cl. 74—354)

1

This invention relates to agricultural implements and particularly to grain drills.

An object of the invention is to provide a novel low wheel grain drill construction especially adapted for use with pneumatic-tired wheels.

Another object of the invention is to provide a low wheel grain drill of improved construction in which the conventional axle connecting the supporting wheels is eliminated, in which adequate clearance is provided for the operation of the furrow openers, and in which at the same time the grain box is lowered so that it can be more easily filled.

Another object of the invention is to provide a simplified and more efficient ground wheel drive for a grain drill.

A further object of the invention is to provide in a grain drill having seed and fertilizer dispensing mechanism, means for driving both seed and fertilizer dispenser at different speeds to control the flow of material.

Other objects and advantages will become clear from the following detailed description when read in conjunction with the accompanying drawings, wherein:

Figure 1 is a view in side elevation of a low-wheeled grain drill embodying the features of the present invention attached to a tractor to be drawn thereby;

Figure 2 is an elevation of the grain drill as viewed from the rear;

Figure 4 is an end elevation in partial section;

Figure 5 is a detail which shows the driving mechanism for the seed and fertilizer drive shafts; and Figure 6 is a section on the line 6—6 of Figure 5.

Figure 3:
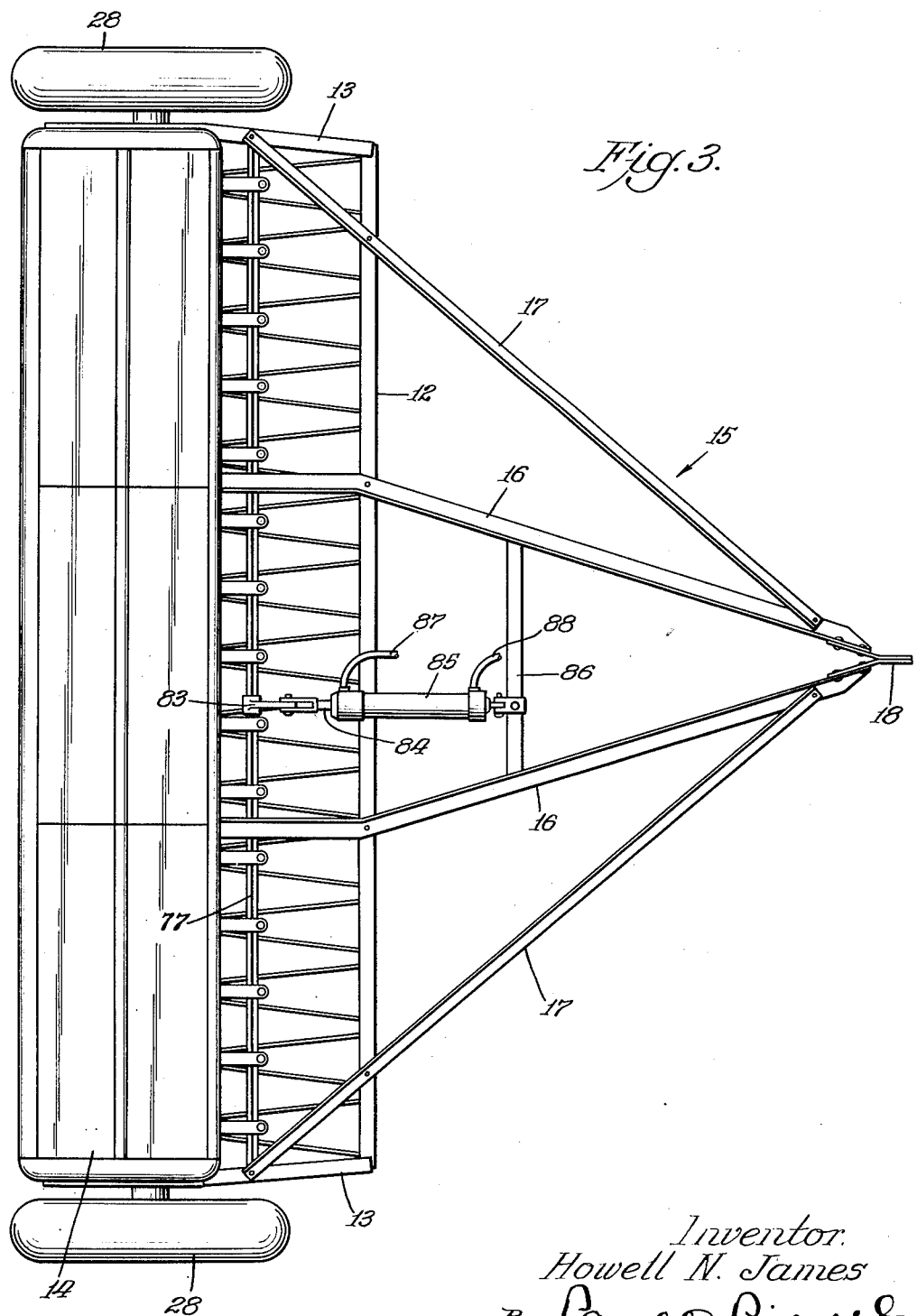
Figure 3 is a plan view of the grain drill.
Figure 7:
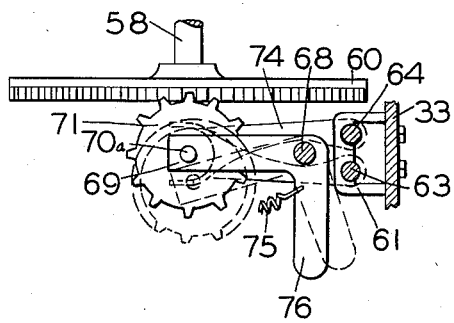
Fig. 7 is a view partly in section on the line 7—7 of Fig. 5.
Figure 8:
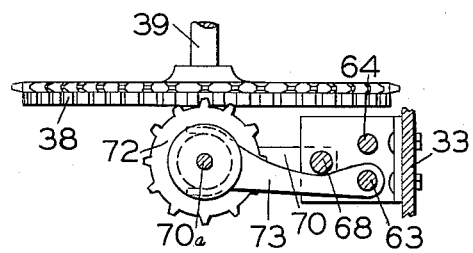
Fig. 8 is a view partly in section on the line 8—8 of Fig. 5.

Referring to the drawings, the grain drill of the present invention is illustrated as attached to a tractor indicated at 10 having a draw-bar 11. The drill comprises a generally rectangular frame including a transverse front frame bar 12 and side or end bars 13. The rear ends of the side bars 13 are joined by a grain box 14. The grain drill is provided with a draw-frame generally indicated by the number 15 including a pair of inner longitudinally extending angle bars 16 secured to the front bar 12 and to the grain box, and a pair of outer angle bars 17 secured to the front frame bar 12 and the side bars 13 and converging forwardly. The for-

2 wardly converging ends of the inner bars 16 are secured to a Y-shaped hitch member 18, and the forward ends of the bars 17 are affixed to the forward portions of the bars 16. A triangular draw-frame of great strength and rigidity is thus provided for connection of the implement to a tractor. As will be noted in Figure 1, hitch member 18 is provided with a number of vertically spaced apertures 19 for the attachment thereto of a clevis 20 which in turn is pivotally connected to the draw-bar 11 by means of a vertical pivot pin 21. The provision of the holes 19 in member 18 permits the vertical adjustment of the front end of the draft-frame.

The grain drill of the present invention is provided with furrow openers of conventional form to open furrows in the ground for the reception of seed and fertilizer dispensed thereto from the receptacle. These furrow opener units indicated by the numeral 22 are located at spaced points transversely of the machine. Each unit comprises a disk opener 23 pivotally connected by forwardly and upwardly extending drag links 24 to the front frame bar 12. The furrow opener units are thus connected to the grain drill frame for generally vertically swinging movement with respect thereto. The grain box 14 is divided into forward and rearward compartments. The forward compartment is adapted to contain and dispense seed and is represented by the letter S. The rear compartment is for fertilizer and is designated by the letter F. Each of the compartments F and S is provided with conventional mechanism for dispensing seed and fertilizer into a seed tube 25 having a flexible portion 26 inserted in a boot 27 secured to the disks of the furrow opener unit.

The drain drill of the present invention is mounted upon ground wheels 28, each of which is carried upon an extension of the end wall 29 of the grain box. This extension comprises a plate member 30 secured to the end wall 29 of the box by bolts 31. The plate member 30 is generally triangular in shape, the apex being at the bottom, and is provided with inwardly turned flanges 32 and 33. In the lower end of the supporting plate member 30 is journaled a stub shaft 34 which passes through the plate and has mounted upon its outer end the wheel 28. It may be understood that the supporting structure and the driving mechanism carried thereby and hereafter to be described is substantially the same at each end of the grain drill frame, and a description of one will suffice for both.

Mounted upon the inwardly projecting end of the stub shaft 34 is a gear 35 having peripheral teeth engaging peripheral teeth 36 upon a gear wheel 37, which is also provided with teeth 38 upon the face thereof and concentrically arranged in rows. Gear 37 is mounted upon a shaft 39 carried by the plate 30 and the peripheral teeth 36 thereof likewise mesh with a gear 40 carried by a shaft 41. A smaller gear 42 is likewise mounted upon the shaft 41. Gear 40 meshes with a gear 43 rotatable upon a shaft 44, while gear 42 meshes with a gear 45 rotatable upon the shaft 44.

It may be noted that shaft 44 at each end of the grain drill is the fertilizer dispenser drive shaft and extends parallel to the grain box to a location near the center thereof, as shown in Figure 2. The shaft 44 is supported by brackets 45' secured to and depending from the grain box.

The fertilizer drive shaft 44 is capable of being operated at both slow and fast speeds. The mechanism by which the adjustment may be made for varying the speed of the fertilizer shaft is shown in section in Figure 6. In Figure 6 it will be noted that the gears 43 and 45 engaging the gears 40 and 42, respectively, are rotatably mounted upon shaft 44 at spaced locations thereon. Between the two gears 43 and 45 a clutch 46 is provided and splined to the shaft for limited axial movement therealong. Clutch 46 has teeth 47 on opposite faces thereof engageable with teeth 48 and 49 in the gears 43 and 45 respectively. Clutch 46 is moved into and out of engagement with the teeth 48 or 49 of the gears 43 and 45 by a shifting mechanism comprising a spindle 50 extending through an aperture in the flange 32 of the supporting plate 30 and provided on its outer end with a handle 51 movable over a sector 52 secured to the flange 32. Spindle 50 extends through a swivel 53 secured to the plate 30, and a spring 54 surrounds the spindle, abutting at one end a pin 50ª in spindle 50 and at the other end the flange portion 32. Handle 51 is thus held in engagement with the sector 52 and the handle may be turned to adjusted positions thereon. Spindle 50 likewise carries an arm 55 which is provided with a projection 56 adapted to be received in a groove 57 in the clutch 46. Thus by turning the spindle 50 to the right or left the clutch 46 may be shifted into engagement with the teeth 48 of gear 43 or with the teeth 49 of gear 45. Teeth 52ª of the sector are so shaped that upon engagement of handle 51 therewith the action of spring 54 causes the spindle to turn as the handle slides along the inclined edge of the tooth and to assist the shifting of the clutch. With the teeth 47 engaged with the teeth 48 of gear 43, the drive from the shaft 41 is through gear 40 and gear 43 to operate the fertilizer shaft 44. This is the fast speed. On the other hand, with the teeth 47 in engagement with the teeth 49 of gear 45, slow speed is provided from shaft 41 through gear 42 and gear 45 to drive the fertilizer shaft 44.

Seed drop mechanism for dispensing material from the compartment S of the grain drill box includes a transversely extending drive shaft 58 having mounted thereupon a gear 59 similar to gear 37 but having only concentrically arranged rows of teeth 60 on the face thereof. A pair of vertically spaced brackets 61 and 62 are secured to the flange 33 of the supporting plate 30 and are apertured to receive for sliding movement therein a pair of vertically extending posts 63 and 64 having handles 65 and 66, respectively. Posts 63 and 64 are notched as indicated at 67 so that they may be adjusted to selected positions. Brackets 61 and 62 are provided with additional apertures to seat a spindle 68 for rocking movement. Spindle 68 has secured thereto vertically spaced arms 69 and 70 having mounted between the outer ends thereof a generally vertically extending post, not shown, having rotatably mounted thereupon a splined tube 70ª which carries for sliding movement thereon pinions 71 and 72, having teeth adapted to mesh respectively with the concentrically arranged rows of teeth on gears 59 and 37. Pinions 71 and 72 are adjustable upon the post 70ª by mechanism comprising arms 73 and 74 mounted upon the posts 63 and 64, respectively. The pinions 71 and 72 may be swung toward and away from the gears 37 and 59 by an arm 76 secured to arm 69. The pinions are biased to engagement with these gears by a spring 75 connected to arm 76. The pinions 71 and 72 are thus independently movable upon the post 70 to engage selected rows of teeth upon the gears 37 and 59 to vary in a wide range the speed with which the seed plate drive shaft 58 is operated and thus control the delivery of seed to the furrows formed by the furrow openers.

The furrow openers are vertically moved between operating and transport positions by lift means including a transverse rock-shaft 77 having its ends rotatably mounted upon the side frame bars 13 and angle bars 16. Shaft 77 has mounted thereupon a number of rearwardly extending lift arms 78 at laterally spaced points thereon. Each of the arms 78 is connected to one of the furrow opener units 22 by a connecting rod 79 pivotally connected to the furrow opener unit and slidably received in an aperture in the end of the arm 78. The upper end of the rod is provided with an adjustable collar 80 to be engaged by the lift arm 78 when the furrow openers are to be lifted, and a spring 81 is provided between the arm 78 and an adjustable collar 82 provided on the lower portion of the connecting rod 79. It will be noted that in the operating position indicated in Figure 4 the arm 78 is compressing the spring 81 to flexibly hold the furrow openers in the ground. By rocking the rock-shaft 77 all the furrow opener units may be raised or lowered simultaneously. This is accomplished by the provision of an upwardly extending arm 83 on the shaft 77 near the center thereof. The upper end of this arm is pivotally connected to the bifurcated end of a piston rod 84 received in a cylinder 85 pivotally mounted at its front end upon a cross-brace 86 provided between the longitudinally extending angle bars 16 of the draw frame. This is a double-acting cylinder and is connected by conduits 87 and 88 to the power plant of the tractor 10. Fluid may be supplied to the cylinder 85 for actuating the piston rod 84 to raise and lower the furrow opener units by any suitable mechanism driven by the tractor and preferably from a hydraulic pump operated by the tractor power plant and under the control of the operator thereof.

It is believed that the operation of the grain drill of the present invention will be clearly understood from the foregoing description. However, it should be understood that the invention has been described in its preferred embodiment, and that modifications may be made therein without departing from the spirit of the invention or the scope of the appended claims.

What is claimed is:

1. In drive mechanism for a wheeled grain drill or the like wherein a combination seed and fertilizer box is provided at its ends with a depending supporting plate and seed and fertilizer drive shafts, a stub axle extending through the lower portion of each said plate, a wheel on the outer end of said axle and a gear on the inner end thereof, means rotatably supporting an end of the seed and fertilizer drive shafts in said plate, gears carried on said shafts for transmitting drive thereto, the gear on the seed shaft being disk shaped and having concentric rows of teeth thereon, and means for transmitting drive from the axle gear to the seed and fertilizer shaft gears including a second disk gear carried on the plate having peripheral teeth engageable with the axle gear to be driven thereby and with the fertilizer shaft to transmit drive thereto, a spindle adajacent the disk gears perpendicular to the axes thereof, a pair of pinions on the spindle engageable with the respective disk gears for transmitting drive at variable speed from the wheel axle to the seed plate shaft, means for mounting the spindle on the plate for swinging movement thereof bodily toward and away from the disk gears, and means for independently sliding the pinions on the spindle to vary the speeds of the seed and fertilizer shafts.

2. In drive mechanism for a wheeled grain drill or the like wherein a combination seed and fertilizer box is provided at its ends with a depending supporting plate and seed and fertilizer drive shafts, a stub axle extending through the lower portion of each said plate, a wheel on the outer end of said axle and a gear on the inner end thereof, means rotatably supporting an end of the seed and fertilizer drive shafts in said plate, gears carried on said shafts for transmitting drive thereto, the gear on the seed shaft being disk shaped and having concentric rows of teeth thereon, and means for transmitting drive from the axle gear to the seed and fertilizer shaft gears including a second disk gear carried on the plate having peripheral teeth engageable with the axle gear to be driven thereby, a spindle swingably mounted on the plate, a pair of pinions independently slidable on the spindle and engageable with the disk gears for transmitting drive at variable speed from the wheel axle to the seed plate shaft, means connected to said spindle for swinging the latter to and from the disk gears, and means for independently sliding the pinions on the spindle.

HOWELL N. JAMES.

REFERENCES CITED

The following references are of record in the file of this patent:

UNITED STATES PATENTS

| Number | Name | Date |
|---|---|---|
| 185,397 | Leach | Dec. 19, 1876 |
| 489,268 | Robb | Jan. 3, 1893 |
| 496,782 | Henry | May 2, 1893 |
| 543,049 | Patric | July 23, 1895 |
| 553,705 | Dealtry | Jan. 28, 1896 |
| 710,271 | Heath et al. | Sept. 3, 1902 |
| 717,154 | Baseman | Dec. 30, 1902 |
| 771,485 | Myers | Oct. 4, 1904 |
| 801,633 | Armitage et al. | Oct. 10, 1905 |
| 827,694 | La Bare | July 31, 1906 |
| 872,590 | Sturrock et al. | Dec. 3, 1907 |
| 1,282,139 | Targosky | Oct. 22, 1918 |
| 1,452,286 | Bozard et al. | Apr. 17, 1923 |
| 1,517,268 | Van Brunt | Dec. 2, 1924 |
| 1,751,951 | Schaeffer | Mar. 25, 1930 |
| 1,753,505 | Dyer | Apr. 8, 1930 |
| 2,199,251 | Wolksy | Apr. 30, 1940 |
| 2,290,240 | James | July 21, 1942 |
| 2,350,107 | Gandrud | May 30, 1944 |
| 2,391,975 | Hyland | Jan. 1, 1946 |
| 2,430,696 | Acton | Nov. 11, 1947 |

FOREIGN PATENTS

| Number | Country | Date |
|---|---|---|
| 1,961 | Austria | Aug. 25, 1900 |
| 88,494 | Switzerland | May 16, 1921 |